United States Patent [19]

Vander Heyden

[11] Patent Number: 5,347,873
[45] Date of Patent: Sep. 20, 1994

[54] DOUBLE WING VORTEX FLOWMETER WITH STROUHAL NUMBER CORRECTOR

[75] Inventor: William H. Vander Heyden, Mequon, Wis.

[73] Assignee: Badger Meter, Inc., Milwaukee, Wis.

[21] Appl. No.: 119,312

[22] Filed: Sep. 9, 1993

Related U.S. Application Data

[63] Continuation-in-part of Ser. No. 46,047, Apr. 9, 1993, abandoned.

[51] Int. Cl.$^5$ .............................................. G01F 1/32
[52] U.S. Cl. .............................. 73/861.22; 73/861.24
[58] Field of Search ............ 73/861.22, 861.24, 861.05, 73/861.23, 198, 118.2

[56] References Cited

U.S. PATENT DOCUMENTS

| | | | |
|---|---|---|---|
| 1,935,445 | 11/1933 | Heinz | 73/861.24 |
| 3,116,639 | 1/1964 | Bird | 73/861.22 |
| 3,719,073 | 3/1973 | Mahon | 73/861.22 |
| 3,867,839 | 2/1975 | Herzl | 73/861.24 |
| 3,881,352 | 5/1975 | McShane | 73/861.23 |
| 3,886,794 | 6/1975 | McShane | 73/861.22 |
| 3,986,796 | 10/1976 | Moiroux et al. | 416/364 |
| 4,048,854 | 9/1977 | Herzl | 73/861.02 |
| 4,094,194 | 6/1978 | Herzl | 73/861.24 |
| 4,171,643 | 10/1979 | Frick | 73/861.24 |
| 4,181,020 | 1/1980 | Herzl | 73/861.24 |
| 4,202,211 | 5/1980 | Perry | 73/198 |
| 4,248,090 | 2/1981 | Sawayama et al. | 73/620 |
| 4,275,602 | 6/1981 | Fujishiro et al. | 73/861.22 |
| 4,297,898 | 11/1981 | Herzl | 73/861.22 |
| 4,526,040 | 7/1985 | Matsubara | 73/861.24 |
| 4,699,012 | 10/1987 | Lew et al. | 73/861.24 |
| 4,716,770 | 1/1988 | Herzog | 73/861.24 |
| 4,735,094 | 4/1988 | Marsh | 73/861.24 |
| 4,754,649 | 7/1988 | Lew | 73/861.05 |
| 4,831,883 | 5/1989 | Kamenster | 73/861.22 |
| 4,862,750 | 9/1989 | Nice | 73/861.24 |
| 4,869,099 | 9/1989 | Takahashi et al. | 73/118.2 |
| 4,966,040 | 10/1990 | Ohmae | 73/861.22 |
| 4,986,134 | 1/1991 | Lew | 73/861.24 |
| 5,005,426 | 4/1991 | Lew | 73/861.22 |
| 5,005,427 | 4/1991 | Ohmae | 73/861.22 |
| 5,076,105 | 12/1991 | Lew | 73/861.24 |
| 5,095,760 | 3/1992 | Lew | 73/861.24 |
| 5,186,056 | 2/1993 | Lew | 73/861.24 |

FOREIGN PATENT DOCUMENTS

| | | | |
|---|---|---|---|
| 57-54809 | 4/1982 | Japan | 73/861.24 |
| 0009026 | 1/1983 | Japan | 73/861.24 |

Primary Examiner—Richard E. Chilcot, Jr.
Assistant Examiner—William L. Oen
Attorney, Agent, or Firm—Quarles & Brady

[57] ABSTRACT

A vortex flowmeter includes a body having a flow passage, a vortex generator that generates a standing transverse wave in the flow passage, and first wing and second wings in the passage downstream of the generator. A circuit that utilizes sensors in the two wings is provided for first determining an operational phase difference, $\Delta\phi_m$ between the signals representing movement of the first and second wings. A microprocessor then determines a corrected vortex frequency, $f$corr, in response to a ratio of a predetermined calibration phase difference $\Delta\phi_c$ to the measured phase difference $\Delta\phi_m$.

10 Claims, 1 Drawing Sheet

DOUBLE WING VORTEX FLOWMETER WITH STROUHAL NUMBER CORRECTOR

This application is a continuation-in-part of application Ser. No. 08/046,047, filed Apr. 9, 1993, now abandoned.

BACKGROUND OF THE INVENTION

This invention relates to a meter for measuring fluid flow by detecting Karman vortices, In particular, the invention is an improved vortex flowmeter that compensates for changes in the Strouhal Number, dimensional changes of a bluff body, or for measurement error associated with conditions in a pipe which distort the fluid velocity profile.

The accuracy of vortex flowmeters depends in part on using a proper value for the Strouhal Number, $N_s$. The Strouhal Number is a non-dimensional flow number that is related to the stability of fluid flow when an obstruction is placed in the flow. Once the Strouhal Number is determined or calibrated for a particular vortex flow meter, it typically remains constant when the meter operates. This means that the Strouhal Number can usually be pre-determined before installation without sacrificing flowmeter accuracy. However, the Strouhal Number changes substantially at very high (i.e. 2,000,000) or very low (i.e. 20,000) Reynold's Number, $R_e$. It also makes an apparent change when piping conditions are altered from ideal conditions, which is illustrated by small errors in measurement. In these circumstances, or any other circumstances where the Strouhal Number changes after installation, a vortex flowmeter might not be accurate.

The accuracy of vortex flowmeters also depends in part on using the proper characteristic dimension for an obstruction (i.e., a bluff body) placed in the flow path. As vortex flowmeters operate over time, these obstructions tend to erode and their characteristic dimension changes, In time, this causes vortex flowmeters to be inaccurate.

In addition, the accuracy of ordinary vortex flowmeters depends on the velocity profile of the fluid as it approaches and impinges on the bluff body. For vortex flowmeters to be accurate, it is usually required that the velocity profile be fully developed. Certain portions of piping such as elbow or expanders distort a velocity profile. Therefore, an ordinary vortex flowmeter should be installed only after many pipe diameters of straight pipe. This can be a burdensome requirement. Especially since velocity profiles can be distorted not only after pipe bends, but also when internal pipe diameters are mismatched at pipe joints, or even when the friction factor of pipe walls changes.

In general, the operation of vortex flowmeters is well known. An elongated obstruction, called a bluff body, is placed transverse to the direction of fluid flow within a conduit and generates vortices in its wake. The vortices are induced by and shed alternately from opposite sides of the bluff body. This is the Karman effect. The frequency of vortex shedding is inversely proportional to the width of the bluff body and directly proportional to the velocity of the flow, so that detecting the frequency generates signals indicative of fluid flow velocity. The measured fluid flow velocity past the bluff body, $V_m$, is described by the equation:

$$V_m = \frac{f_m D}{N_s}$$

where $N_s$ is the Strouhal Number, $f_m$ is the measured shedding frequency, and D is the diameter or width of the bluff body.

Vortices are generated in pairs, often referred to as two rows, and are disposed on either side of the longitudinal axis of the bluff body. The rotational direction of the individual vortices is such that each reinforces the other and combines with the other. As the vortices proceed away from the bluff body, the result is loss of individual character for each vortex and the creation of sinusoidal-like fluid motion transverse to the direction of the velocity of the fluid. In effect, the vortices form a standing transverse wave beyond the bluff body with the wavelength given by:

$$\lambda = \frac{V}{f_{vor}} = \frac{D}{N_s}$$

where V is the actual fluid flow velocity past the bluff body, and $f_{vor}$ is the actual shedding frequency.

The sinusoidal-like wave is persistent, with normally expected dissipation, unless disrupted by some mechanical means. In general, the strength of the vortices increases with increased velocity and with increased fluid density in the relationship of $\rho V^2$.

A variety of means for detecting vortices have been proposed, including the use of acoustic detection (U.S. Pat. No. 3,886,794 issued Jun. 3, 1975 to McShane), hot wires (U.S. Pat. No. 4,275,602 issued Jun. 30, 1981 to Fujishiro, et al), and a physical member located downstream of the obstruction and subject to deflection as alternating vortices pass by. In this latter approach, the physical member often takes the form of a wing and the wing may either be pivotably mounted in the conduit (U.S. Pat. No. 3,116,629 issued Jan. 7, 1964 to Bird and U.S. Pat. No. 4,181,020 issued Jan. 1, 1980 to Herzl) or be fixed to the conduit (U.S. Pat. No. 4,699,012 issued Oct. 13, 1987 to Lew, et al). In co-pending U.S. patent application Ser. No. 07/813,875, filed on Dec. 19, 1991, Vander Heyden, et al. disclose a double wing vortex flowmeter that makes flow measurements which are substantially unaffected by external vibrations.

A major shortcoming with present day vortex flowmeters is that they are sometimes inaccurate because the measured fluid flow velocity $V_m$ as determined by the measured shedding frequency $f_m$, depends on the Strouhal Number $N_s$, the characteristic dimension of the bluff body D, and on the fluid velocity profile; and present day vortex flowmeters do not compensate for changes in these conditions which may occur after installation. The present invention improves the accuracy of vortex flowmeters by compensating flow measurements for changes that may occur in these conditions after installation.

SUMMARY OF THE INVENTION

In accordance with the invention, a vortex flowmeter includes a body having a flow passage, an elongated vortex generator in the flow passage transverse to the direction of flow through the passage, a first wing in the passage downstream of the generator, and a second wing in the passage downstream of the first wing. The vortex generator generates a standing transverse wave.

A sensor is associated with each wing to provide a signal in response to the movement of each wing. Means are provided for determining a phase difference $\Delta\phi_m$ between the signals representing movement of the first and second wings.

It is preferred that the invention determine fluid velocity, $V_m$, in accordance with $$V_m = \frac{\Delta\phi_c}{\Delta\phi_m} \frac{f_m D}{N_{si}}$$

where $\Delta\phi_m$ is a phase difference determined during flowmeter operation, $\Delta\phi_c$ is a calibrated phase difference determined before operating the flowmeter, $f_m$ is a vortex shedding frequency, D is a characteristic dimension associated with the vortex generator as determined before operating the flowmeter and $N_{si}$ is an initial Strouhal Number as determined before operating the flowmeter. In a preferred embodiment, the phase difference $\Delta\phi_m$ is determined using a circuit or microprocessor.

In the above equation, the expression $$\left(\text{preferably } \frac{D}{(\Delta\phi_c N_{si})}\right)$$

can be replaced by a single expression $f_{corr}$, representing the corrected vortex frequency.

The sensors may take a variety of forms, including thermal, optical, and pressure sensitive sensors. Preferably, the sensors are piezoelectric transducers which may be mounted within the wings.

The invention also resides in a method of measuring flow through a flow passage which includes the steps of using a vortex generator with a characteristic dimension D to generate rows of vortices in the flow passage to form a standing transverse wave flow pattern beyond the vortex generator, detecting the vortices at one position in the flow passage, detecting the vortices at a second position in one flow passage downstream from the first position, generating a sisal at each detection position representative of the frequency of the vortices at that position, determining a phase difference $\Delta\phi_m$ between the first and second positions of the standing transverse wave from the generated signals, determining a vortex shedding frequency $f_m$, and multiplying the vortex shedding frequency $f_m$ by a predetermined constant (preferably $$\left(\text{preferably } \frac{D}{(\Delta\phi_c N_{si})}\right)$$

and by the phase difference $\Delta\phi_m$.

A principal object of the invention is to provide an extremely accurate vortex flowmeter.

Another object of the invention is to provide a vortex flowmeter that substantially eliminates errors in measurement resulting from changes in the Strouhal Number or erosion of the bluff body.

Yet another object of the invention is to provide a vortex flowmeter with improved immunity from inaccuracies caused by non-uniform velocity profile.

The foregoing and other objects and advantages of the invention will appear in the following detailed description. In the description, reference is made to the accompanying drawings which illustrate preferred embodiments of the invention.

DETAILED DESCRIPTION OF THE PREFERRED EMBODIMENTS

Figure 1:
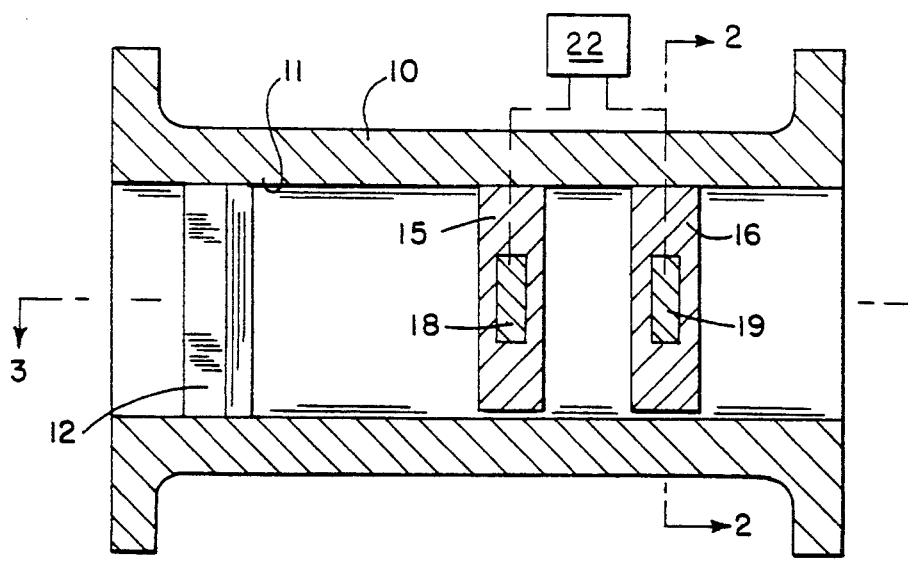
FIG. 1 is a longitudinal view in vertical section taken through a flowmeter in accordance with the present invention.
Figure 2:
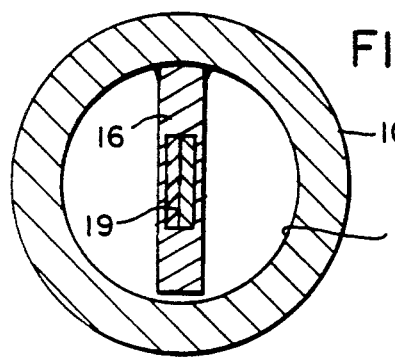
FIG. 2 is a view in vertical cross-section taken in the plane of the line 2—2 of FIG. 1.

The vortex flowmeter includes a body 10 of relatively rigid construction so that it will move as a unit when subjected to external forces such as vibrations. The flowmeter body 10 is adapted to be inserted in the piping for the flow of fluid which is to be measured. The body 10 defines a flow passage 11 of circular cross-section. An obstruction 12 in the form of an elongated bluff body is disposed across the flow passage 11 and along the longitudinal axis 13 of the flow passage. In a known manner, the obstruction 12 will function as a vortex generator producing vortex rows on either side of the longitudinal axis.

Downstream of the vortex generator 12 within the flow passage 11 is a first wing 15 that is rigidly attached at its top to the body 10. Alternatively, the wing 15 can be attached to the body 10 through a soft flexible member. The first wing 15 extends downwardly transverse to the direction of flow through the passage 11 and through the longitudinal axis 13. The bottom end of the wing 15 is free of the body 10 so that the first wing 15 is cantilevered within the flow passage 11. A second wing 16 identical in construction to the first wing 15 is disposed downstream of the first wing 15.

Both of the wings 15 and 16 contain internally embedded sensors 18 and 19, respectively. The sensors 18 and 19 are in the form of piezoelectric transducers. The sensors 18 and 19 are of known construction and they comprise a piezoelectric ceramic which, when subjected to strain, will produce a voltage signal indicative of the strain. Useable ceramics would be those made by Keramos, Inc. of Indianapolis, Ind. and identified as Kezite K15 and K350 ceramics. When a wing 15 or 16 is displaced by vortex activity, the associated sensor 18 or 19 is subjected to strain and the sensor produces a signal related to the vortex activity. The signal from each sensor 18 and 19 is continuously relayed to a microprocessor 22 where the vortex activity is analyzed.

Figure 3:
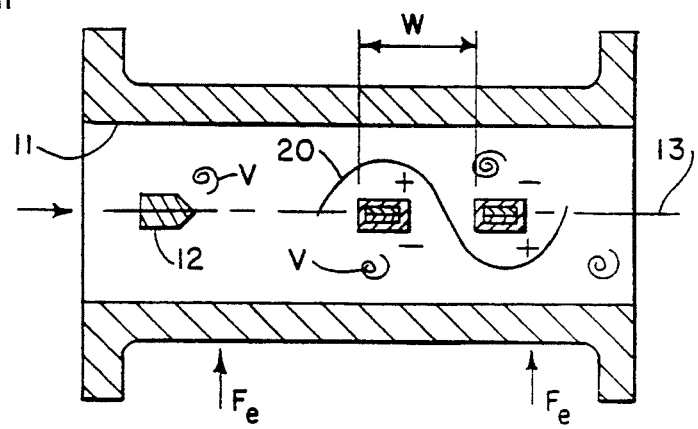
FIG. 3 is a view in longitudinal section taken in the plane of the line 3—3 of FIG. 1.

Referring to FIG. 3, the vortices V shed from the vortex generator 12. The spacing between vortices depends on the characteristic dimension D of the vortex generator 12 and the Strouhal Number $N_s$ of the flow. Although the vortices are independently shed from either side of the vortex generator 12, Von Karman showed that stable shedding can exist only if the swirl of each vortex reinforces its opposite partner. It is therefore useful to consider that oppositely shed vortices form a dynamic wave oscillating to and fro across the areas of the wings 15 and 16. This is illustrated schematically in FIG. 3 by the wave 20. Although the wave 20 in FIG. 3 is illustrated as being a regular sinusoidal curve, in reality the wave would be very chaotic and somewhat hyperbolic. The two wings 15 and 16 are preferably disposed within the paths of the vortex street such that the wings will be subjected to deflections caused by the vortices that are 180 degrees out of phase. The reasons for this are explained in a co-pending patent application filed by Vander Heyden, et al. on Dec. 19, 1991, Ser. No. 07/812,815. In order that the wings 15 and 16 be subjected to deflections caused by vortices 180 degrees out of phase with each other, the wings 15 and 16 are spaced apart a distance W which should be a multiple of a half wave length, i.e. $n\frac{1}{2}\lambda$ of the vortex street generated by the vortex generator 12. Thus, while one wing is being deflected by the vortices in one direction the other wing will be deflected in the opposite direction relative to the longitudinal axis 13.

Under ideal conditions, the fluid velocity $V_m$ can be measured by measuring the shedding frequency $f_m$ and using the following relation:

$$V_m = \frac{f_m D}{N_{si}} \quad (1)$$

where D is the characteristic diameter of the bluff body 12 and $N_{si}$ is the Strouhal Number as determined under ideal conditions. The shedding frequency $f_m$ can be continuously determined in the microprocessor 22 by analyzing a signal from either sensor 18 or 19 as is generally known in the art. Under ideal conditions, the characteristic diameter D of the bluff body, and the Strouhal Number $N_{si}$ are known and are constant. However, inaccuracies can arise during operation when either the characteristic diameter D erodes or the Strouhal Number $N_s$ fluctuates or drifts. The present invention compensates for these inaccuracies by continuously monitoring signals from sensors 18 and 19 to determine an actual phase difference $\Delta\phi_m$ between the signals, and uses this value to adjust Eq. (1).

The wavelength $\lambda$ of the standing transverse wave that forms beyond the bluff body is given by:

$$\lambda = \frac{D}{N_s} \quad (2)$$

Figure 4:
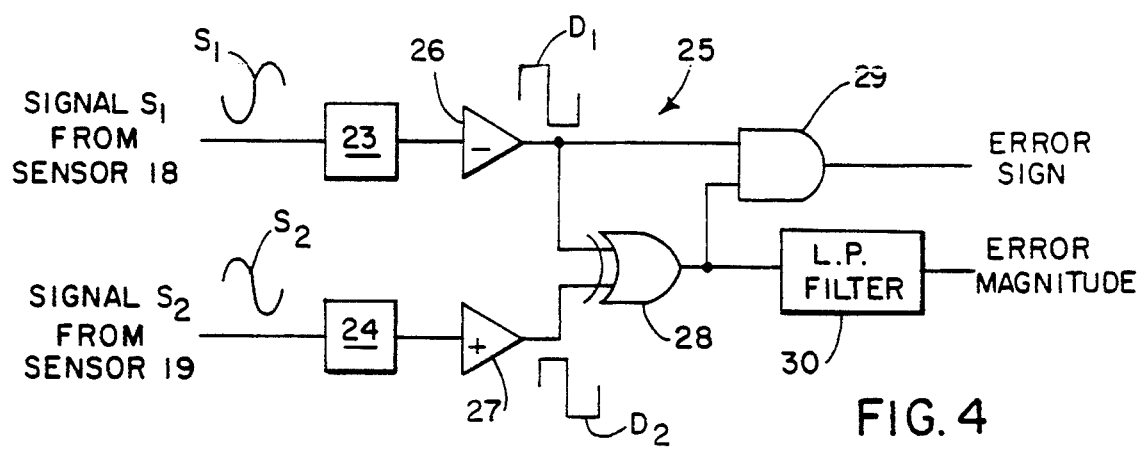
FIG. 4 is a schematic diagram showing a circuit that determines a phase difference in accordance with the present invention.

The wavelength $\lambda$ varies with changes in the characteristic dimension of the bluff body and changes in the Strouhal Number $N_s$ that may occur during operation of the flowmeter. Referring to FIG. 3, the second wing 16 is located a distance W downstream of the first wing 15. The phase difference $\Delta\phi$ of the vortex wave between the first wing 15 and the second wing 16 is represented by:

$$\Delta\phi = 2\pi \left( \frac{W}{\lambda} \right) \quad (3)$$

where the phase difference $\Delta\phi$ is determined in radians. The actual phase difference $\Delta\phi_m$ between the first and second wing can be determined in the microprocessor 22 by comparing the vortex activity at each wing 15 and 16 using conventional techniques. FIG. 4 shows the logic of a circuit 25 for determining the actual phase difference $\Delta\phi_m$.

Referring to FIG. 4, signals $S_1$ and $S_2$ from sensors 18 and 19, respectively, are combined in the circuit 25 to determine the actual phase difference $\Delta\phi_m$. Signals $S_1$ and $S_2$ are generally sinusoidal-like, but $S_2$ is about 180 degree out of phase with $S_1$ because sensor 19 is placed about one-half of wavelength downstream of sensor 18. Charge amplifiers 23 and 24 may be necessary to amplify the signals $S_1$ and $S_2$ from sensors 18 and 19 before the signals are analyzed in the circuit 25. The amplified signal $S_1$ is converted into an inverted square wave $D_1$ by an analog to digital inventor/convertor gate 26. The inverted square wave $D_1$ is a binary representation over time indicating when the sensor 18 is displaced from a neutral position. The amplified signal $S_2$ is converted into a square wave $D_2$ by an analog to digital convertor gate 27, but the signal $S_2$ is not inverted. The square wave $D_2$ is a binary representation over time indicating when the sensor 19 is displaced from a neutral position.

The square waves $D_1$ and $D_2$ are compared in a logical "exclusive-or" gate 28. The output from the "exclusive-or" gate 28 can be described as a step function having a low value when the signals $D_1$ and $D_2$ are contemporaneously high, or contemporaneously low; and a high value when $D_1$ and $D_2$ are out of phase. The output from the "exclusive-or" gate 28 is then compared to the inverted square wave $D_1$ by a logical "and" gate 29 to determine whether signal $D_1$ trails or precedes signal $D_2$. The output from the "exclusive-or" gate 28 is also provided to a low pass filter 30 to determine the magnitude of the phase difference between $D_1$ and $D_2$. A low pass filter 30 is sufficient for this purpose because changes in the measured phase difference $\Delta\phi_m$ are slow compared to vortex frequency. The value of $\Delta\phi_m$ can thus be determined in a relatively continuous manner by monitoring the output of the logical "and" gate 29 and the low pass filter 30.

It should be appreciated that there are other ways known in the art for determining a phase difference between two waves. Any of these methods should be sufficient for the present invention.

Under ideal conditions before the flowmeter is installed in the field, such as in a laboratory, the characteristic dimension D and the ideal Strouhal Number $N_{si}$ are known and the wavelength $\lambda$ of the standing wave under ideal conditions can be measured using Eq. (2). The second wing 16 is then placed at a distance equal to one half $\lambda$ downstream of the first wing 15. The meter can then be tested in the laboratory to determine a calibrated phase difference $\Delta\phi_c$ between the first and second wings. The value for $\Delta\phi_c$ should be about 180° since the second wing 16 is preferably placed about one half $\lambda$ downstream of the first wing 15.

After the flowmeter has been installed in the field for operation, the actual phase difference $\Delta\phi_m$ between the two wings 15 and 16 is continuously measured. The actual phase difference $\Delta\phi_m$ between the first 15 and second 16 wings can vary with changes in the characteristic dimension D of the bluff body, with changes in the Strouhal Number $N_s$, and with changes in the fluid velocity profile caused because of installation conditions. In fact, referring to Eqs. (2) and (3), it can be seen that variations in the phase difference $\Delta\phi_m$ are such that:

$$\frac{\Delta\phi_m}{\Delta\phi_c} = \left( \frac{D}{N_s} \right)_m \bigg/ \left( \frac{D}{N_s} \right)_i \quad (4)$$

where $$\left(\frac{D}{N_s}\right)_m$$

is the ratio of the characteristic diameter of the bluff body to the Strouhal Number at the time $\Delta\phi_m$ is measured during operation, and $$\left(\frac{D}{N_s}\right)_i$$

is the same ratio but determined by testing and calibration before installation.

Equation (1) which is for ideal conditions can therefore be adjusted to correct for variations in the characteristic dimension D of the bluff body, the Strouhal Number $N_s$, or the velocity profile by incorporating the ratio $$\frac{\Delta\phi_c}{\Delta\phi_m}.$$

$$V = \frac{\Delta\phi_c}{\Delta\phi_m} \frac{f_m D}{N_{si}} \quad (5)$$

In accordance with Equation (5), the vortex flowmeter measures the fluid velocity $V_m$ by continuously measuring both the vortex shedding frequency $f_m$ and the phase difference $\Delta\phi_m$ of the standing transverse wave between the two wings 15 and 16. The meter thus accurately measles fluid velocity $V_m$ by continuously compensating for variation in the characteristic dimension of the bluff body, the velocity profile, or the Strouhal Number $N_s$.

When the actual phase difference $\Delta\phi_m$ becomes much different than $\pi$ (i.e. 180°), the bluff body is ruined and should be replaced.

Although the invention is shown as incorporating piezoelectric transducers as the sensors, other forms of sensors could be employed, including other forms of pressure sensors. For example, the movement of the wings could be detected optically or acoustically.

The term "wings" as used in this application is not meant in a limiting sense and is not meant to define a particular shape or structure. Instead, the term is used to refer to any physical element imposed downstream of the vortex generator that will be subjected to deflection by the vortex streets.

I claim:

1. A vortex flowmeter comprising:
   a body having a passage for flow of a fluid therethrough in a longitudinal direction;
   a vortex generator positioned in the passage for transmitting vortices downstream;
   a first vortex sensor located at a first sensor position downstream of the vortex generator, the first vortex sensor producing a first signal of the vortex frequency, $f_m$, in response to passage of vortices through the first sensor position;
   a second vortex sensor located at a second sensor position downstream of the vortex generator, the second vortex sensor producing a second signal of the vortex frequency, $f_m$, in response to passage of vortices through the second sensor position, said second signal being phase delayed from said first signal;
   means for determining a measured phase difference $\Delta\phi_m$ between the first signal and the second signal; and
   means for comparing the measured phase difference $\Delta\phi_m$ to a calibration phase difference $\Delta\phi_c$ representing the phase difference between the first sensor position and the second sensor position wing under pre-operational, calibration conditions;
   means for determining a corrected vortex frequency, $f_{corr}$, of said flow meter during operation in response to a ratio of the predetermined calibration phase difference $\Delta\phi_c$ to the measured phase difference $\Delta\phi_m$.

2. The vortex flow meter of claim 1, wherein
   the first vortex sensor is located in the passage in a first wing downstream of the vortex generator; and
   wherein the second vortex sensor is located in the passage in a second wing downstream of the vortex generator.

3. The vortex flowmeter of claim 2, wherein the sensors are piezoelectric transducers.

4. The vortex flowmeter of claim 2, wherein the means for determining the measured phase difference, $\Delta\phi_m$, comprises a circuit for comparing the signals from the first and second vortex sensors located in the first and second wings, respectively.

5. The vortex flowmeter of claim 1, further comprising means for determining a fluid velocity $V_m$ in accordance with the following relation:

$$V = \frac{\Delta\phi_c}{\Delta\phi_m} \frac{f_m D}{N_{si}}$$

where $\Delta\phi_m$ is the determined phase difference, $\Delta\phi_c$ is a calibrated phase difference between the first and second wings as determined before operating the flowmeter, $f_m$ is the vortex frequency, D is a characteristic length associated with the vortex generator as determined before operating the flowmeter, and $N_{si}$ is the initial Strouhal Number as determined before operating the flowmeter.

6. The flowmeter of claim 1 wherein the calibration phase difference $\Delta\phi_c$ is predetermined to be 180°.

7. A method of determining a fluid velocity $V_m$ of fluid flowing through a flow passage comprising:
   using a vortex generator with a characteristic dimension D to generate rows of vortices in the flow passage to form a standing transverse wave flow pattern;
   detecting the vortices at one position in the flow passage;
   detecting the vortices at a second position in the flow passage located downstream from the first position;
   producing a first signal of a vortex frequency, $f_m$, in response to detecting the vortices at the first detection position;
   producing a second signal of a vortex frequency, $f_m$, in response to detecting the vortices at the second detection position;
   determining a phase difference $\Delta\phi_m$ between the first and second signals;
   determining measured fluid velocity $V_m$ by obtaining a corrected vortex frequency, $f_{corr}$, by multiplying the vortex frequency, $f_m$, by the ratio of the predetermined calibration phase difference $\Delta\phi_c$ to the measured phase difference $\Delta\phi_m$.

8. The method of claim 7, wherein the fluid velocity $V_m$ is further obtained by multiplying the correction frequency, $f_{corr}$, by the ratio of $$\left(\frac{D}{N_{si}}\right),$$

where D is the characteristic diameter of the vortex generator as determined before operation, and $N_{si}$ is the initial Strouhal Number as determined before operation.

9. The method of claim 7, wherein the second position is located downstream from the first position a distance that is an odd multiple of half of a wavelength of the standing transverse wave.

10. A method as recited in claim 7 wherein the phase difference $\Delta\phi_m$ is determined by:
continuously transmitting the generated signals to a circuit; and
analyzing the continuously transmitted signals in the circuit.

* * * * *

UNITED STATES PATENT AND TRADEMARK OFFICE
CERTIFICATE OF CORRECTION

PATENT NO. : 5,347,873
DATED : Sept. 20, 1994
INVENTOR(S) : Vander Heyden, William H.

It is certified that error appears in the above—identified patent and that said Letters Patent is hereby corrected as shown below:

| | |
|---|---|
| Col. 1, line 11 | "vortices," should be --vortices.--. |
| Col. 1, line 41 | "changes," should be --changes.--. |
| Col. 3, line 25 | "$(\text{preferably} \frac{D}{(\Delta\phi_c N_{si})})$" should be -- $f_m \left(\frac{\Delta\phi_c}{\Delta\phi_m}\right)$ --. |
| Col. 3, line 43 | "sisal", should be --signal--. |
| Col. 3, line 49 | Remove "(preferably". |
| Col. 5, line 63 | Remove "," and insert a --.--. |
| Col. 6, line 45 | "halt" should be --half--. |
| Col. 7, line 35 | "measles" should be --measures--. |
| Col. 7, line 36 | "variation" should be --variations--. |
| Col. 8, line 9 | Remove "wing". |

Signed and Sealed this

Third Day of January, 1995

Attest:

BRUCE LEHMAN

Attesting Officer

Commissioner of Patents and Trademarks